July 31, 1962  J. E. KASTEN  3,047,174
DEVICE FOR UNLOADING FORAGE CROPS FROM WAGONS OR THE LIKE
Filed July 21, 1959  2 Sheets-Sheet 1

INVENTOR.
JOHN E. KASTEN
BY
ATTORNEY

July 31, 1962 J. E. KASTEN 3,047,174
DEVICE FOR UNLOADING FORAGE CROPS FROM WAGONS OR THE LIKE
Filed July 21, 1959 2 Sheets-Sheet 2
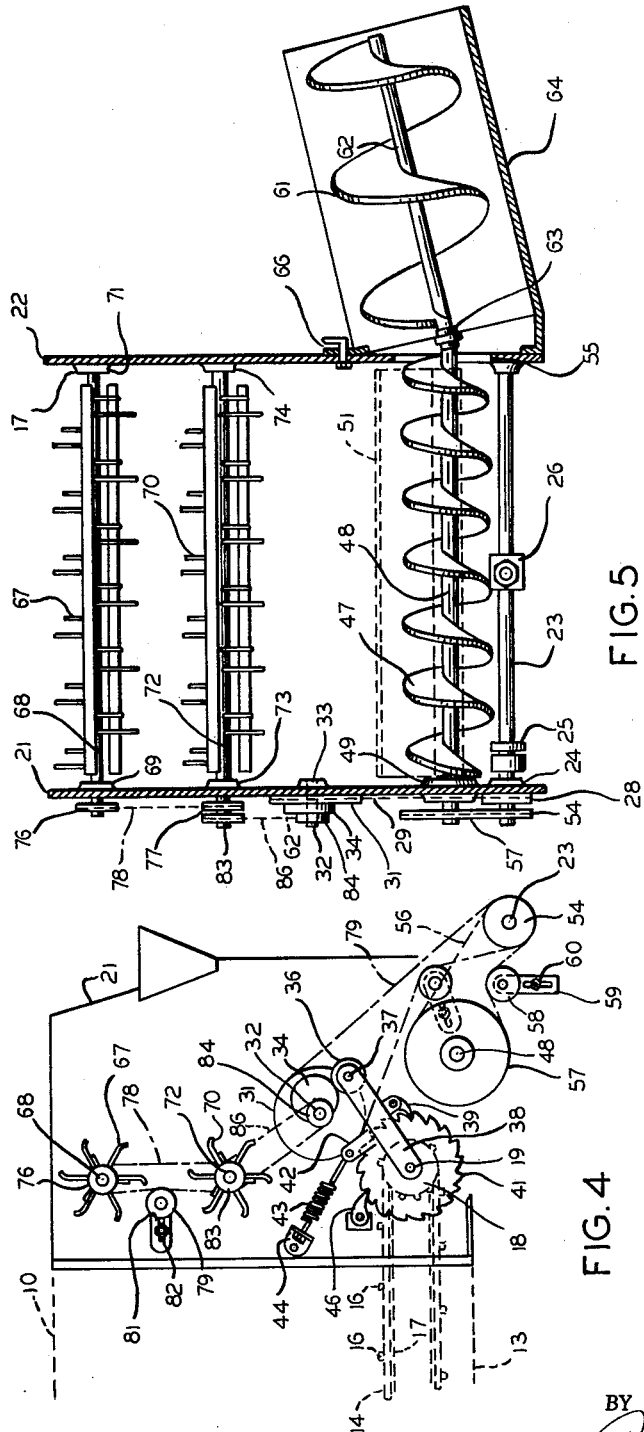
INVENTOR.
JOHN E. KASTEN
BY
ATTORNEY United States Patent Office 3,047,174
Patented July 31, 1962

3,047,174
DEVICE FOR UNLOADING FORAGE CROPS FROM WAGONS OR THE LIKE
John E. Kasten, % Kasten Mfg. Corp., Allenton, Wis.
Filed July 21, 1959, Ser. No. 828,598
2 Claims. (Cl. 214—520)

This invention relates generally to devices for unloading farm vehicles or the like, and more particularly to an improved device for unloading and discharging forage crops laterally of such vehicles.

The device according to the present invention is particularly adapted for use with a farm vehicle having a conveyor moving longitudinally of the bed thereof, the device including structure cooperating with the moving conveyor and adapted to change the direction of movement thereof, so that it is discharged laterally of the vehicle. More particularly the apparatus according to the present invention is adapted for use with a forage wagon or the like capable of being drawn by a tractor and receiving power therefrom, the wagon being adapted to discharge its contents laterally into a feed bin as it moves longitudinally of the feed bin, so that the forage is distributed evenly throughout the length of the bin.

It is a principal object of this invention to provide an improved un-loading device for a farm vehicle, such un-loading device being capable of discharging the contents laterally of the vehicle.

Another object is to provide a screw type conveyor cooperating with a flight conveyor movable generally longitudinally of the bed of the vehicle, the screw type conveyor and the flight conveyor being both operated from a comon power take-off from a tractor or other haulage device.

Still another object is to provide an intermittently movable flight conveyor which cooperates with a screw type conveyor to discharge forage or other crops, the screw type conveyor being adapted to discharge to one side of the vehicle.

Other and further objects of the invention will be apparent as the description proceeds, when taken in conjunction with the drawings, in which:

FIG. 4 is a side view of the unloading mechanism seen in FIG. 1, showing the driving mechanism for the screw conveyor and the intermittently operated flight conveyor; and FIG. 5 is a transverse sectional view of the device, certain parts being shown in elevation, showing also details of an angularly disposed removable screw type delivery conveyor.

Figure 3:
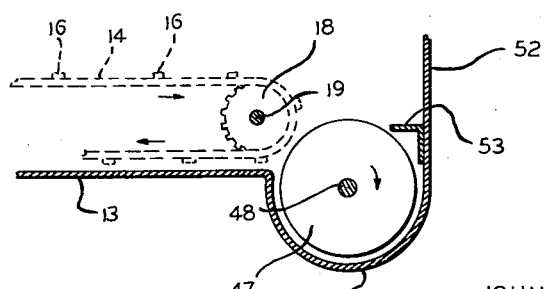
FIG. 3 is a longitudinal schematic cross section taken through the vehicle seen in FIG. 1, showing the relation of the screw type conveyor to the intermittently operated flight conveyor.

Referring now to the drawings, there is shown a farm vehicle indicated generally by the reference numeral 10 mounted for movement upon ground engaging wheels 11. The vehicle 10 is adapted to be towed by means of a tow bar 12 connected in any convenient fashion to the tractor or other prime mover, not shown. The vehicle 10, see FIGS. 3 and 4, has a bed 13 affording a support for an endless belt conveyor 14 having flights 16 thereon adapted to engage forage or other feed material carried in the vehicle 10. The belt 14 is driven by laterally spaced sprocket chains 17 which are reversed in direction about a sprocket 18 mounted fast on a drive shaft 19.

The sprocket 18 and the shaft 19 are supported in laterally spaced plate-like frame members 21 and 22 extending from the forward end of the vehicle 10.

Figure 1:
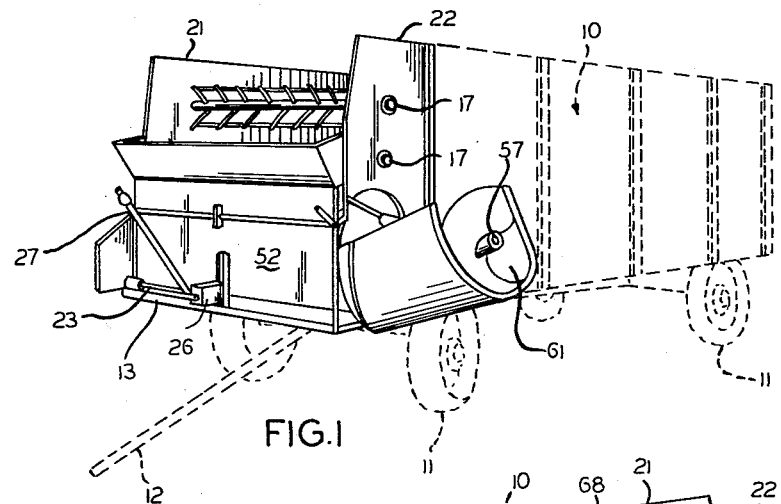
FIG. 1 is a perspective view of an improved forage crop unloader having the improvements according to the present invention embodied therein.
Figure 2:
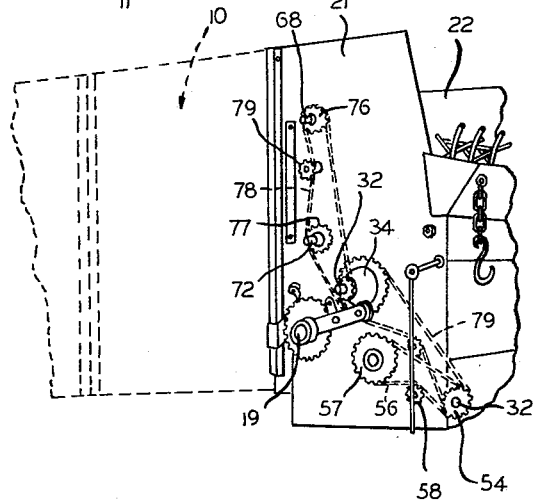
FIG. 2 is a fragmentary perspective view thereof.

Structure is provided for driving the flight conveyor 14 in intermittent fashion, and to this end there is provided a drive shaft 23 supported in a bearing 24 in the frame member 21, and connected at one end to a drive housing 26 secured to the bed 13 of the vehicle 10 at the forward end thereof. The drive housing 26 is connected to a power take-off shaft 27, see FIG. 1, which can be connected in any convenient manner to a tractor, not shown. A clutch 25 is provided in the shaft 23 to disconnect the shaft 23 from the device according to the present invention, and the shaft 23 is connected to a chain sprocket 28. A sprocket chain 29 in turn connected to a chain sprocket 31 fast on the shaft 32 drives the sprocket 31, which is supported in a bearing 33 in the side frame 21.

The chain sprocket 31 is fast with an eccentric 34 cooperating with a follower 36 rotatably mounted at 37 on a lever 38 pivotally mounted upon the shaft 19. The lever 38 carries a driving pawl 39 cooperating with a ratchet wheel 41 fast on the shaft 19. The lever 38 has an extension 42 therefrom which is connected to a spring 43 having its other end connected to an abutment 44 on the side frame 21. The spring 43 urges the lever 38 and the follower 36 into contact with the eccentric 34, and as the sprocket 31 rotates on its shaft 32 the lever 38 will be given oscillatory motion to advance the ratchet wheel 41 on the chain sprocket 18 in step-by-step fashion, the belt conveyor 14 and its flights 16 being likewise advanced in step-by-step fashion. Retrograde movement of the ratchet wheel 41 is prevented by a locking pawl 46 mounted to the side frame 21.

Structure is provided for receiving the discharge of the intermittently operated conveyor 14 and moving it laterally of the vehicle 10 so that the material can be discharged to one side thereof. Such structure comprises a screw type conveyor 47 mounted on a shaft 48 supported in a bearing 49 in the side frame 21. The screw type conveyor is mounted to rotate within a trough 51 of essentially semi-circular cross section with an essentially vertical front wall 52 extending upwardly therefrom. An angle 53 extends laterally of the wall 52 and is mounted on the inner face thereof to limit or regulate the amount of forage fed into screw type conveyor 47.

Structure is provided for driving the screw type conveyor 47 and comprises a driving sprocket 54 fast on the power shaft 23, the sprocket 54 cooperating with a sprocket chain 56 and a sprocket 57 driven thereby mounted on the shaft 48. An idler shoe 58 mounted on a support 59 is adjustable in position by means of an adjusting screw 60, the position of the idler shoe 58 adjusting the tension of the sprocket chain 56.

From the description thus far it will be seen that the screw type conveyor 47 is driven in a continuous fashion while the fight conveyor 16 is driven intermittently, only enough material being advanced by the flights 16 as will conveniently be moved laterally by the screw conveyor 47.

The screw conveyor 47 cooperates with an auxiliary or delivery conveyor 61 having a shaft 62 connected to the shaft 48 of the screw conveyor 47 by means of a disconnectable universal coupling 63. The auxiliary or delivery conveyor 61 rests in a semi-circular casing 64 which is disposed angularly upwardly with respect to the side of the vehicle 10, the casing 64 being supported on the side frame 22 by means of an attaching hook 66. Since the universal coupling 63 is disconnectable, both the casing 64 and the auxiliary screw type conveyor 61 can be detached from the main screw conveyor as desired.

It should be noted that the auxiliary screw conveyor 61 has a larger diameter than the screw conveyor 47 to eliminate any buildup or blocking of the forage, so that it can be delivered freely therefrom.

The movement of the flights 16 causes the forage within the vehicle 10 to be moved toward the screw type conveyor 47. Structure is provided agitating or paddling the forage material toward the screw conveyor 47. To this end, upper and lower beaters 67 and 70 extend between the spaced frame members 21 and 22. Beater 67 is supported upon a shaft 68 turning in bearings 69 and 71 in the respective side frames 21 and 22. Beater 70 is likewise supported upon shaft 72 extending between the spaced side frames 21 and 22, shaft 72 being supported in bearings 73 and 74 located respectively in the side frames 21 and 22.

Apparatus is provided for rotating the beaters 67 and 70, and to this end the shaft 68 supporting the beater 67 has a sprocket 76 fast thereon, and shaft 72 supporting the beater 70 likewise has a sprocket 77 fast thereon, the two sprockets 76 and 77 having a sprocket chain 78 trained therearound. Adjustment for the slack in the sprocket chain 78 is provided by an idler shoe 79 mounted for free turning upon a bracket 81 held by an adjusting screw 82 to the frame 21.

The two shafts 68 and 72 are driven by means of a sprocket 83 fast on the shaft 72 and a sprocket 84 fast on the shaft 32, which is driven from the main power shaft 23, the two sprockets 83 and 84 being connected by sprocket chain 86.

It will be seen therefore, that the beaters 67 and 70 are driven continuously to move the forage or other crop from the top of the vehicle 10 down into the screw conveyor 47, while the belt conveyor 14 including the flights 16 thereon is moved intermittently, the continuous motion of the beaters 67 and 70 and the intermittent motion of the belt conveyor 14 being such as to provide a constant supply of forage to the screw conveyor 47.

It will be evident from the description foregoing that the unloading device described herein enables the vehicle upon which it is mounted to move longitudinally of a feed bin, and for the vehicle to discharge its contents laterally while moving in such longitudinal direction.

Although there has been shown a specific construction of the device constituting the invention herein, the parts may be changed in form, shape and configuration without departing from the efficient operation of the device, and the right to make such changes, without affecting the invention, is reserved, especially as such changes are embraced by the spirit and scope of the claims.

Having thus described the invention, what I claim is:

1. In an unloading machine for forage crops or the like, a vehicle having ground engaging elements and including means for attaching said vehicle to a tractor or the like, means for taking power from said tractor, a vehicle bed including an endless flight conveyor moving longitudinally of said bed, a pair of frames extending from said vehicle, a screw conveyor supported by said frames and having the longitudinal axis thereof extending transversely of said vehicle, said screw conveyor being adapted to receive the material moved by said flight conveyor, driving means for said flight conveyor and said screw conveyor supported by one of said frames, said driving means being connected to said power taking means, means cooperating with said driving means for giving intermittent motion to said flight conveyor comprising an eccentric and oscillatory follower, a ratchet wheel driving said flight conveyor and a dog cooperating therewith driven by said follower, at least one beater supported by said frames and spaced above said screw conveyor for urging material into position for movement by said screw conveyor, means for driving said beater including means for connecting said last named driving means to the driving means for said screw conveyor and said flight conveyor, and an auxiliary screw conveyor driven from said first named screw conveyor and extending from one of said frames, and means for detachably securing said auxiliary screw conveyor to said frame.

2. In an unloading machine for forage crops or the like, a vehicle having ground engaging elements and including means for attaching said vehicle to a tractor or the like, means for taking power from said tractor, a vehicle bed including an endless flight conveyor moving longitudinally of said bed, a pair of frames extending from said vehicle, a screw conveyor supported by said frames and having the longitudinal axis thereof extending transversely of said vehicle, said screw conveyor being adapted to receive the material moved by said flight conveyor, driving means for said flight conveyor and said screw conveyor supported by one of said frames, said driving means being connected to said power taking means, means cooperating with said driving means for giving intermittent motion to said flight conveyor, comprising an eccentric and an oscillatory follower driven thereby, a ratchet wheel driving said flight conveyor and a dog mounted on said oscillatory follower and cooperating with said ratchet wheel, a plurality of beaters supported by said frames and spaced above said screw conveyor for urging material into position for movement by said screw conveyor, means for driving said beaters including means for connecting said last named driving means to the driving means for said screw conveyor and said flight conveyor, and an auxiliary screw conveyor driven from said first named screw conveyor and extending from one of said frames.

References Cited in the file of this patent
UNITED STATES PATENTS

| | | |
|---|---|---|
| 2,434,718 | Recker | Jan. 20, 1948 |
| 2,771,203 | Collins et al. | Nov. 20, 1956 |
| 2,783,907 | Hudgins | Mar. 5, 1957 |
| 2,970,710 | Jensen | Feb. 7, 1961 |